(12) United States Patent
Sundaram

(10) Patent No.: US 12,172,110 B2
(45) Date of Patent: Dec. 24, 2024

(54) DIVIDING WALL COLUMN SEPARATOR WITH INTENSIFIED SEPARATIONS

(71) Applicant: EXXONMOBIL RESEARCH AND ENGINEERING COMPANY, Annadale, NJ (US)

(72) Inventor: Narasimhan Sundaram, Annadale, NJ (US)

(73) Assignee: EXXONMOBIL RESEARCH AND ENGINEERING COMPANY, Annadale, NJ (US)

( * ) Notice: Subject to any disclaimer, the term of this patent is extended or adjusted under 35 U.S.C. 154(b) by 222 days.

(21) Appl. No.: 17/776,423

(22) PCT Filed: Nov. 11, 2020

(86) PCT No.: PCT/US2020/060017
§ 371 (c)(1),
(2) Date: May 12, 2022

(87) PCT Pub. No.: WO2021/113039
PCT Pub. Date: Jun. 10, 2021

(65) Prior Publication Data
US 2022/0401851 A1 Dec. 22, 2022

Related U.S. Application Data

(60) Provisional application No. 62/943,951, filed on Dec. 5, 2019.

(51) Int. Cl.
*B01D 3/14* (2006.01)
(52) U.S. Cl.
CPC ............. *B01D 3/141* (2013.01); *B01D 3/145* (2013.01)

(58) Field of Classification Search
CPC .................................. B01D 3/141; B01D 3/145
See application file for complete search history.

(56) References Cited

U.S. PATENT DOCUMENTS

| | | | |
|---|---|---|---|
| 5,788,743 | A | 8/1998 | Watzenberger et al. |
| 6,395,950 | B1 * | 5/2002 | Rice .......................... C07C 7/04 |
| | | | 585/737 |
| 7,329,330 | B2 | 2/2008 | Gall |
| 8,312,738 | B2 | 11/2012 | Singh |
| 9,278,898 | B2 | 3/2016 | Cameretti |

(Continued)

FOREIGN PATENT DOCUMENTS

EP 1205460 B1 5/2022

OTHER PUBLICATIONS

Written Opinion and International search report of corresponding PCT application PCT/US2020/060017 mailed Feb. 11, 2021.

*Primary Examiner* — Renee Robinson
(74) *Attorney, Agent, or Firm* — Vorys, Sater, Seymour and Pease LLP

(57) ABSTRACT

Systems and methods are provided for improving the operation of a divided wall column for performing distillations. The systems and methods include using a separation stage in a fluid flow pathway for transporting an enriched intermediate stream from a first side of a dividing wall to a second side of a dividing wall. By using a separation stage, the benefit of transporting an enriched intermediate stream can be achieved without requiring precise knowledge of the local concentration profile on the first side of the dividing wall.

16 Claims, 2 Drawing Sheets

(56) References Cited

U.S. PATENT DOCUMENTS

| | | |
|---|---|---|
| 9,504,934 B2 | 11/2016 | Agrawal |
| 10,392,322 B2 | 8/2019 | Bender |
| 10,472,306 B1 | 11/2019 | Frey et al. |
| 2014/0011975 A1 | 1/2014 | Hagen et al. |

\* cited by examiner

DIVIDING WALL COLUMN SEPARATOR WITH INTENSIFIED SEPARATIONS

FIELD

Systems and methods are provided for performing separations using distillation columns with one or more dividing walls.

BACKGROUND

Distillation columns or towers are one of the commonly found structures in a refinery setting. Distillation columns are used for separation of multiple product streams from an input stream using a reduced or minimized amount of footprint in the refinery. Additionally, distillation columns can be valuable for separation of products having adjacent, nearby, and/or overlapping boiling ranges.

Dividing Wall Columns (DWC) are distillation columns containing vertical dividing walls that partition a feed zone from one or more side product drawoff zones. DWC technology allows for reductions in the amount of equipment needed and/or the amount of energy required for performing one or more desired separations. The dividing walls can be used to separate the volume used for receiving input feed(s) to the column from the locations for withdrawal of product streams, thereby reducing product contamination. Additionally or alternately, the dividing walls can be used to create separate compartments for withdrawal of multiple product streams with high purity.

Although dividing wall columns (DWCs) can provide advantages for reduced energy consumption and/or refinery footprint while producing multiple product streams, achieving a desired high purity level can be challenging. Achieving a desired purity level can present additional difficulties when the boiling points between compounds being separated are sufficiently close. What is needed are systems and methods to improve control over the quality of products generated by a divided wall distillation column.

U.S. Pat. No. 9,278,898 describes a dividing wall column separation system and method for separating cyclodecanone from cyclodecanol in a feed containing other components. During a separation, a fraction is withdrawn from one side of the dividing wall and added to the opposite side of the dividing wall via an external conduit. The goal described in U.S. Pat. No. 9,278,898 is to withdraw a fraction enriched in components that boil between cyclodecanone and cyclodecanol, which are referred to as "medium boilers". This is described as improving the ability to withdraw a product stream of the "medium boilers" from the opposite side of the dividing wall.

U.S. Pat. No. 9,504,934 describes an example of a dividing wall column separation system where liquid can be transferred from one side of the dividing wall to the opposite side without transferring vapor.

U.S. Pat. No. 7,329,330 describes a dividing wall column system for separation of 1,6-hexanediol, 1,5-hexanediol, and caprolactone.

U.S. Pat. No. 8,312,738 describes a dividing wall column system where one or more dividing walls are at least partially permeable with regard to at least one component in a feed being separated.

SUMMARY

In an aspect, a method for separating a feed into a plurality of products, is provided. The method includes passing a feed comprising a plurality of components into a first divided volume on a first side of a dividing wall in a distillation column. The feed can include i) at least one of a target component and a target boiling range and ii) one or more components or boiling ranges that are substantially adjacent to the target component or the target boiling range. The first divided volume can be in fluid communication with a top common volume and in fluid communication with a bottom common volume. The method can further include operating the distillation column to separate the feed into a plurality of products. The method can further include withdrawing, during the operating, an intermediate stream from an intermediate withdrawal location on the first side of the dividing wall. The intermediate stream can include the at least one target component or target boiling range and at least one substantially adjacent component or substantially adjacent boiling range. The intermediate stream can include a greater volume percentage of the at least one target component or target boiling range than the feed. Optionally, the intermediate stream can include fewer components than the feed. The method can further include passing the intermediate stream into a separation stage to form a separation stage effluent and a separation stage rejection stream. The separation stage effluent can include a greater weight percentage of the at least one target component or target boiling range than the intermediate stream. The method can further include passing the separation stage effluent into a second divided volume on an opposite side of the dividing wall in the distillation column. Additionally, the method can include withdrawing a product stream comprising the at least one target component or target boiling range from the second divided volume, the product stream comprising a greater weight percentage of the at least one target component or target boiling range than the separation stage effluent.

In another aspect, a system for separating a feed is provided. The system includes a distillation column comprising at least one dividing wall defining a first divided volume on a first side of the dividing wall and a second divided volume on an opposite side of the dividing wall. The system further includes a non-distillation based separation stage in fluid communication with the first divided volume and the second divided volume via an external loop.

DETAILED DESCRIPTION

Overview

Figure 1:
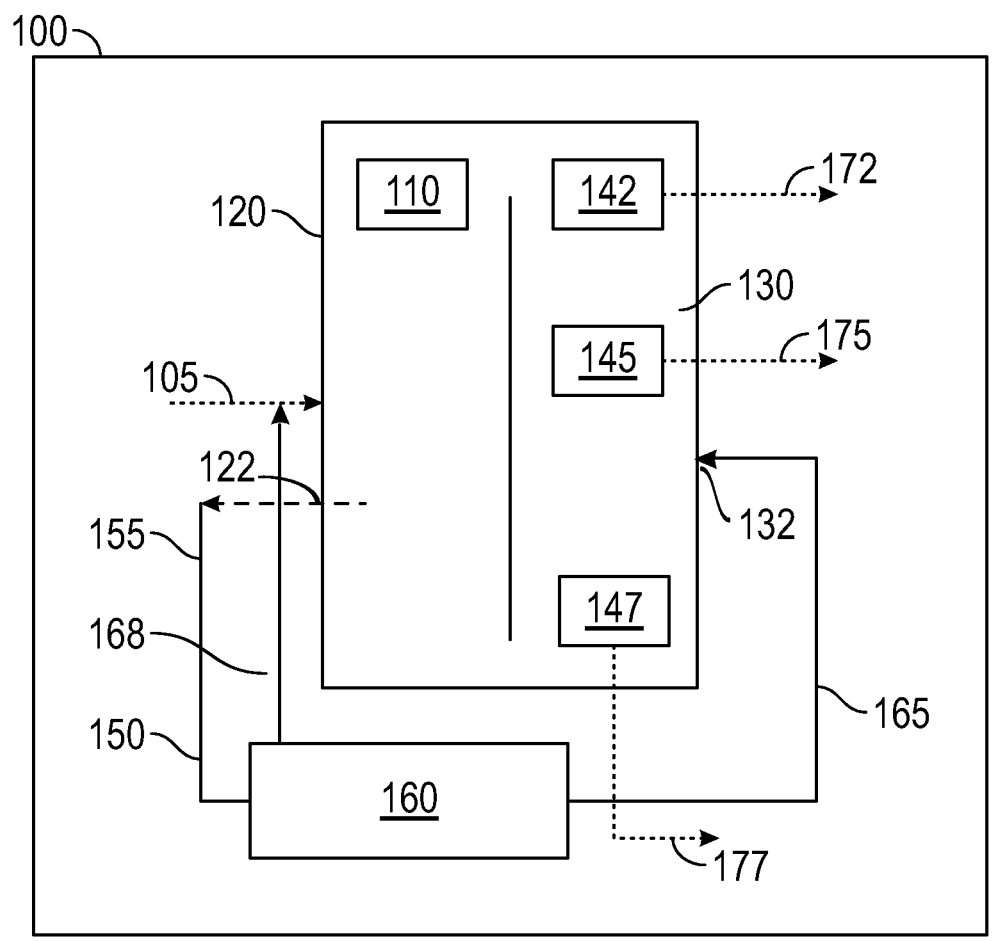
FIG. 1 shows an example of a dividing wall column with a single dividing wall and a circulation loop for transferring a product from a first side of the dividing wall to a second side of the dividing wall.

In various aspects, systems and methods are provided for improving the operation of a divided wall column for performing distillations. In particular, systems and methods are provided for improving the ability to obtain a high purity product during a separation. The systems and methods include using a separation stage in a fluid flow pathway for transporting an enriched intermediate stream from a first side of a dividing wall to a second side of a dividing wall. By using a separation stage, the benefit of transporting an enriched intermediate stream can be achieved without requiring precise knowledge of the local concentration profile on the first side of the dividing wall.

Distillation columns are used to separate hydrocarbon and hydrocarbon-like compounds of various types of boiling ranges. Generally, a distillation column is used to separate a feed stream to form at least three products. One product can be an overhead product containing the lowest boiling components in the feed. A second product can be a bottoms product, containing the highest boiling components in the feed. The third (and potentially more) product(s) correspond to intermediate products. A reboiler is typically used to re-heat a portion of the bottoms. This adds heat to maintain a desired column temperature profile, as well as providing an opportunity to return lower boiling components entrained in the bottoms back to the column. Additionally, one or more liquid return loops can be used to manage the temperature profile. Distillation trays, packed beds, or other internal structures providing a function similar to distillation trays can be used within the column to further assist with separating a feed into desired product fractions.

The quality of separation for each product withdrawn from a distillation column can vary based on a variety of factors, including the desired width of the boiling range for the product and the concentration of the product in the feed being separated. In some instances, the difficulty of distillation for a desired product can be increased due to a narrow desired boiling range for the product and/or the presence of other components in the feed with nearby boiling points outside of the desired boiling range. In some instances, another difficulty of distillation for a desired product can be a relatively low concentration of the desired product and/or products in a desired boiling range in the feed.

Dividing wall columns are a type of distillation column that includes one or more dividing walls within the column that traverse less than the full length of the column. Using a dividing wall column can increase the number of distinct products that are withdrawn from a column at an elevated level of purity. For example, different internal structures can be included on opposing sides of a dividing wall, so that different temperature profiles can be maintained. Additionally, by introducing the feed into the tower on a first side of a dividing wall, and by controlling the conditions at the vapor split and/or liquid split for the dividing wall, an increased number of products can be produced from a single column. However, for separations involving components with similar boiling points and/or low concentrations of a desired product, difficulties remain in achieving a high purity product.

One conventional strategy for improving the purity of a separation product for a divided wall column separator is to use an external loop to increase the concentration of the desired separation product. U.S. Pat. No. 9,278,898 describes an example of this strategy. In U.S. Pat. No. 9,278,898, it is described as preferable to withdraw a stream from a first side of a dividing wall at a location where the concentration of a desired product is at or near a maximum. This stream is then passed through the external loop and re-enters the divided wall column on the opposite side of the dividing wall. This is described as providing an increase in the concentration of the desired product in a stream withdrawn from the opposite side of the dividing wall.

Unfortunately, U.S. Pat. No. 9,278,898 does not describe or suggest how to control or determine the height in the column where the concentration of a desired product is at a maximum. In a divided wall column, a variety of factors can influence the location (height) of a concentration maximum for a component (or a defined boiling range of components) within the column. These factors include, but are not limited to, the location of packing materials in the column, the location of recirculation loops, the general temperature profile in the column, and the nature of the feed. For a typical column, however, only a limited number of potential withdrawal locations are available. As a result, forcing the maximum concentration for a target component to align with a withdrawal location can present difficulties.

Additionally, it has been discovered that even a small difference in the withdrawal location on the first side of the dividing column relative to the maximum for the desired product can minimize the benefit of using the external loop to add the withdrawn stream to the opposite side of the column. It would be desirable to reduce or minimize the sensitivity of the withdrawal location relative to the location of the maximum concentration for the desired product.

It has been discovered that adding a separation stage to an external loop can provide an unexpected improvement when using an external loop to improve separation of a target component or boiling range. The external loop can be used to withdraw a stream having an increased concentration of the target component or boiling range from a withdrawal location on a first side of a dividing wall. The withdrawn stream can then be introduced at an input location on the opposing side of the dividing wall to enrich the input location in the target component or boiling range. In particular, by adding a separation stage in the external loop, the sensitivity of the process can be reduced with respect to the withdrawal location of the enrichment stream relative to the location of maximum concentration for the target component or boiling range on the first side of the dividing wall. By reducing the sensitivity of the distillation process to small differences in the local concentration maximum versus the external loop withdrawal location, the benefit of using the external loop can be achieved more easily and with greater process control.

It has further been discovered that adding a separation stage to the external loop can provide greater unexpected benefits under some conditions. For example, greater unexpected benefits can be achieved when the target component or boiling range corresponds to 20 wt % or less of the total composition in the distillation tower, or 10 wt % or less, or 5.0 wt % or less, or 2.0 wt % or less, such as down to 0.1 wt % or possibly still lower. Additionally or alternately, greater unexpected benefits can be achieved when the difference in boiling point between the target component or boiling range is sufficiently small. For example, additional benefits can be achieved when the target component is being separated from a least one substantial adjacent component or boiling range that differs from the target boiling point or boiling range by 5.0° C. or less, or 3.0° C. or less, such as down to 0.5° C. or possibly still a smaller difference. In this discussion, a "substantial adjacent component" is defined as a component in the feed to the distillation tower, different from the target component or boiling range, that a) is present in an amount of 0.1 wt % or more, or 1.0 wt % or more, and b) differs from the target boiling point (for a single target component) or target boiling range by 5.0° C. or less, or 3.0° C. or less, or 1.5° C. or less, such as down to 0.5° C. In this discussion, a "substantial adjacent boiling range" is defined as a plurality of components, different from the target component or boiling range, that a) are present in a combined amount of 0.1 wt % or more, or 1.0 wt % or more, and b) differ from the target boiling point (for a single target component) or target boiling range by 5.0° C. or less, or 3.0° C. or less, or 1.5° C. or less such as down to 0.5° C.

In this discussion, a separation stage can correspond to any convenient type of separator that can provide a concentration increase for a target component in a fluid flow. The concentration increase can be achieved by selectively permitting flow of a target component, by selectively removing a non-target component, or a combination thereof. Examples of suitable separation stages can include, but are not limited to, separation stages based on a membrane separator, a swing adsorption separator, or any other conventional structure used for selectively concentrating a fluid flow. In some aspects, the separation stage can correspond to a non-distillation based separation stage. In this discussion, an "external loop" is defined as one or more conduits that provide fluid communication between a withdrawal location on the first side of a dividing wall and an input location on the opposite side of the dividing wall. At least a portion of the one or more conduits are located outside the distillation tower.

In some alternative aspects, instead of using an external loop, another flow path including a concentrator (i.e., a separation stage) can be used to provide fluid communication between a withdrawal location on a first side of a dividing wall and an input location on the opposite side of the dividing wall. For example, instead of using an external loop, the dividing wall can be permeable or semi-permeable at one or more locations. In such aspects, a membrane, molecular sieve, or another structure can be included in the wall, so that the selectivity for transport of at least one component between the withdrawal location and the input location is modified.

Configuration Examples

In order to facilitate illustration of the control scheme for a dividing wall column, a brief description of a general dividing wall column configuration is provided.

In various aspects, configurations and/or methods as described herein can be used to allow for production of 3 or more products (or 4 or more products, or 5 or more products, or 6 or more products) from a dividing wall column containing one or more dividing walls, such as a plurality of dividing walls. In some aspects, a top product and a bottoms product from the divided wall column can correspond to products that are withdrawn from common packed beds or common volumes within the dividing wall column. With regard to the bottoms product, it is noted that at least a portion of one bottoms product can typically be recycled as part of a reboiler loop to provide additional heat to the distillation column. One or more additional products can also be withdrawn, including a product containing a target component or a target boiling range.

In some aspects, generating multiple products from a dividing wall column can be facilitated by having different packing types and sizes on opposite sides of a dividing wall. Use of different packing types and sizes would be design considerations to optimize the tower design to improve or maximize utilization and reduce or minimize waste volume. As a result of using different packing types and sizes, the pressure drop, capacity and packing efficiency for each horizontally adjacent packed bed section may vary. This can potentially cause the ratio of gas mass flow to cross-sectional area to vary within various portions of the dividing wall column.

FIG. 1 shows an example of a divided wall column configuration that includes an external loop with a separation stage. In the example shown in FIG. 1, a feed containing three components (A, B, and C) is separated using a distillation column that includes a single dividing wall and an external loop with a separation stage. If desired, a feed with a larger number of components can be separated into a greater number of distinct streams. Additionally, more than one dividing wall can be included in the column, to facilitate performing further separations. Components A, B, and C are described as single components in the description of FIG. 1 here to simplify the illustration of the invention. It is understood, however, that any or all of components A, B, and C can instead correspond to a mixture of components that are within a boiling range.

In FIG. 1, a dividing wall column 100 includes a dividing wall 110, a feed input stream 105, a first divided volume 120 (corresponding to a first side of the dividing wall 110), and a second divided volume 130 (corresponding to an opposing side of the dividing wall 110). The dividing wall column 100 further includes an intermediate withdrawal location 122 and an intermediate input location 132. The dividing wall column further includes product withdrawal locations 142, 145, and 147. An external loop 150 provides fluid communication between intermediate withdrawal location 122 and intermediate input location 132. A separation stage 160 is located in the external loop. Separation stage 160 separates intermediate stream 155 to form a separation stage effluent 165 and one or more separation stage rejection streams 168. The dividing wall column produces product streams 172, 175, and 177. The product stream 172 contains a majority of component A. The product stream 175 contains a majority of component B. The product stream 177 contains a majority of component C. It is noted that the feed input stream 105, the beginning portion of external loop 150, and product streams 172, 175, and 177 are shown as dotted lines. This reflects the variability in the location for these streams, depending on the nature of the separation being performed by the divided wall column.

During operation, a feed 105 including components A, B, and C is introduced into dividing wall column via a feed input location. The feed input location results in the feed being introduced into the first divided volume 120. In the example shown in FIG. 1, component A is the lowest boiling component, while component C is the highest boiling component. In the example shown in FIG. 1, the temperature profile in the tower can result in each of components A, B, and C being present in the intermediate liquid 155 that enters external loop 150 at withdrawal location 122. Alternatively, if A has a sufficiently low boiling point (or boiling range), the intermediate liquid 155 entering external loop 150 could include just component B and component C.

After entering the external loop 150, the intermediate liquid 155 passes into separation stage 160. In the example shown in FIG. 1, separation stage 160 selectively allows component B to pass through, so that the separation stage effluent 165 is enriched in component B, while the separation stage rejection stream 168 is enriched in components A and C. This could be based on using an adsorbent that is selective for adsorption of component B, a membrane that is selective for forming a permeate or a retentate enriched in component B, or another convenient non-distillation method for separating component B from components A and C. In an alternative aspect, a separation stage could instead be focused on rejecting a component, so that (for example) a rejection stream could be formed that is enriched in only component A or only component C, while the effluent would be enriched in B as well as one of the other components.

The separation stage rejection stream(s) 168 can be returned to the dividing wall column 100, such as by combination with input feed stream 105 as shown in FIG. 1, or alternatively the rejection stream(s) can be sent to another process for further processing. For rejection steam(s) 168 that are returned to the dividing wall column, the rejection stream(s) 168 can be returned to the first divided volume 120, or to an undivided area above or below the dividing wall. The separation stage effluent 165 is returned to the second divided volume 130. This increases the concentration of component B in the second divided volume 130, allowing for an increased purity (i.e., increased concentration of component B) in product stream 175. In FIG. 1, the separation stage effluent 165 is returned to the second divided volume 130 at a location below the location 145 where product stream 175 is withdrawn. In other aspects, the separation stage effluent 165 can be returned to the second divided volume 130 at a location above the location 145 where product stream 175 is withdrawn. In such other aspects, returning the separation stage effluent 165 at a location above location 145 can facilitate mixing of the separation stage effluent 165 with downflowing liquid in divided volume 130 prior to withdrawal of product stream 175.

Figure 2:
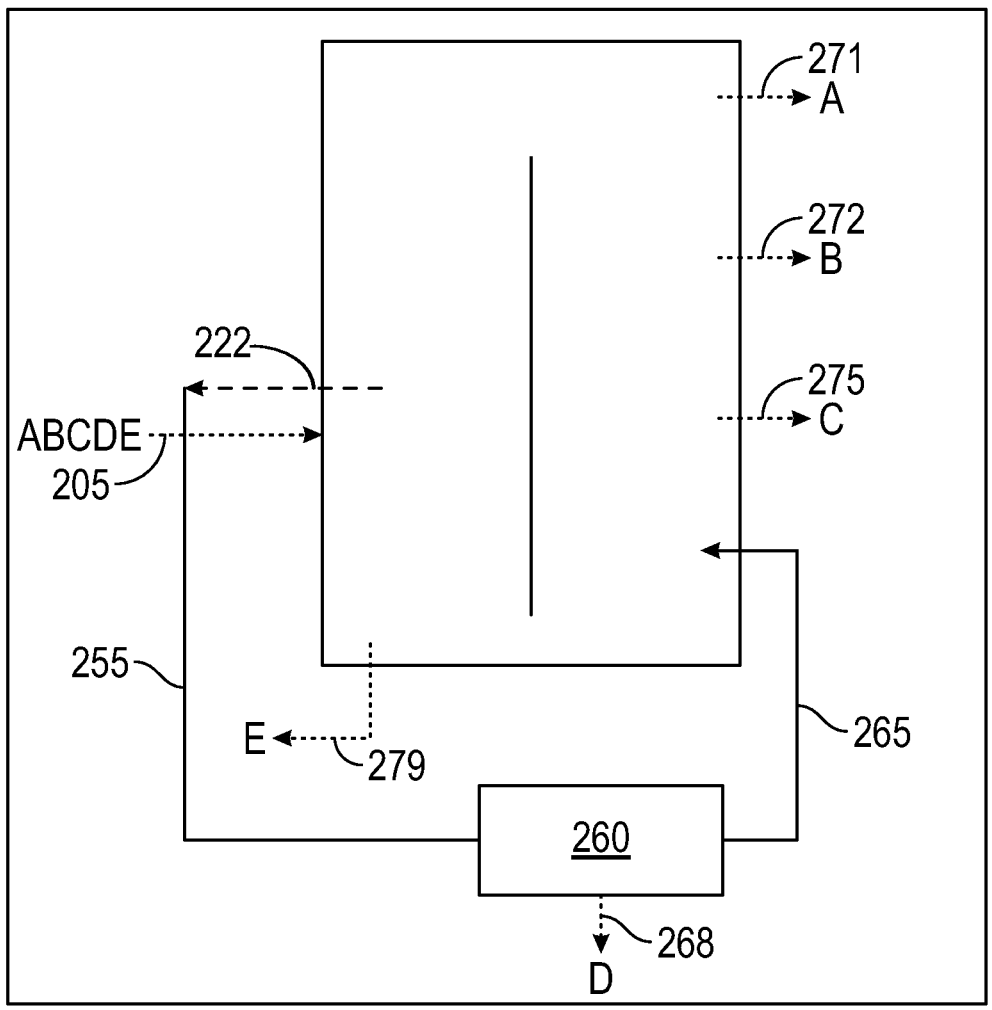
FIG. 2 shows an example of a dividing wall column with a concentrator stage in a circulation loop for transferring a product form a first side of a dividing wall to a second side of the dividing wall.

FIG. 2 shows another example of a dividing wall column separator with an external loop. In FIG. 2, similar numerals are used to indicate similar elements. In the example shown in FIG. 2, feed 205 includes five components, corresponding to components A, B, C, D and E. Optionally, one or more of the components can correspond instead to a mixture of components within a defined boiling range. Component A corresponds to a light component that is substantially in the gas phase at intermediate withdrawal location 222. Component A is removed as top product 271. Component E is a high boiling component that corresponds to a bottoms product 279 in FIG. 2. Based on the boiling points for components A and E, the composition of intermediate liquid 255 primarily includes components B, C, and D.

In the example shown in FIG. 2, separation stage serves to reject component D, so that a rejection stream 268 enriched in component D is formed. For example, separation stage can correspond to an adsorbent (such as an adsorbent in a swing adsorber) that is selective for adsorption of component D. The separation stage effluent 265 is enriched in components B and C. As an alternative, a rejection stream could be formed that is enriched in component B, or enriched in both component B and component D. Product stream 272 comprises a majority of component B. Product stream 275 comprises a majority of component C. Instead of having a product stream comprising a majority of component D that is withdrawn from the distillation tower, in FIG. 2 the rejection stream 268 generated by separation stage 260 can also serve as a product stream for component D. In some aspects, at least a portion of product stream for component D can be generated as an additional product stream from the distillation tower (not shown).

Without being bound by any particular theory, it is believed that using a liquid transfer (such as an external loop) between divided volumes on opposite side of a dividing wall can provide additional benefits for the operation of a dividing wall column. For example, the liquid transfer can assist with maintaining energy balance within the dividing wall column. It has been discovered that improved process control can be achieved by controlling the dividing wall columns based on energy balance instead of mass balance.

The energy balancing can be performed in part based on controlling temperature at a plurality of locations on the feed side within a first divided portion of the column. Using energy balancing based on temperature control at a plurality of locations on the feed side can facilitate maintaining the operation of the dividing wall columns within a single region of phase space that can be suitably approximated by linear models. This can allow conventional process controllers to manage the manipulated and controlled variables. In addition to controlling the temperature at a plurality of locations on the feed side, a plurality of other characteristics can be used as manipulated or controlled variables.

One of the difficulties with conventional methods of process control for dividing wall columns to produce four or more products is maintaining the operation of the DWC in a single region of phase space. Using conventional methods for mass balance control of a distillation column, the goal of column operation can be to operate the column to achieve expected amounts of output at each product location. However, in a divided wall column, different temperatures can be present on opposing sides of a dividing wall. As a result, attempting to manage a column containing a dividing wall based on a mass balance of the feed versus the products can result in unpredictable behavior. For example, in a conventional distillation column, if too much of the feed is being fractionated into an intermediate product, the conventional mass balance response can be to reduce the temperature. However, this may not produce the desired outcome in a column with a dividing wall. In a column with a feed entry volume that is separated from intermediate products by a dividing wall, a potential reason for excess product at a product withdrawal location is due to improper separation of the feed in the feed entry volume. In particular, the initial portion of the column that receives the feed (i.e., the feed entry volume) is typically expected to divide the feed based on boiling range, with certain light components being expected to exit above the liquid split and certain heavy components expected to exit below the liquid split. If the light components exit below the liquid split, excess product can be present at a product withdrawal location. However, attempting to cool the product location will not resolve this issue, and in fact could cause it to become worse by causing a corresponding decrease in temperatures in the feed entry volume on the opposing side of the dividing wall. A similar problem can arise when heavy components exit above the liquid split. Thus, in a mass balanced based control approach, there is a potential that the column could enter a region of phase space where attempting to "correct" the amount of product at an intermediate location could result in taking the column further from the desired operating region.

It has been discovered that control of DWCs can be improved by maintaining energy balance within the column. Instead of attempting to balance the output product draws with the amount of input feed, a DWC can instead be controlled based on maintaining desired or target temperatures at various locations within the DWC. In particular, temperatures near the top and bottom of the feed entry volume can be controlled in order to prevent light components from exiting below the vapor split and prevent heavy components from exiting above the liquid split. By controlling temperatures in the column to achieve target values and target product purities, the operation of the column can be maintained in a desired region of phase space. Optionally, one or more of the target temperatures and/or temperatures used for controlling a controller can correspond to pressure-compensated temperatures, in order to account for the impact of pressure on volatility of components within the column.

Withdrawing a stream from a volume on a first side of a dividing wall and introducing at least a portion of the stream into a volume on an opposite side of the dividing wall can assist with maintaining desired temperatures within a column. In particular, in addition to enriching the opposing side of the dividing wall in a component, the liquid transfer can also provide an energy transfer between the divided volumes.

As an example, a feed could contain 1 vol % or more of one or more light components (or 10 vol % or more), and/or 1 vol % or more of one or more heavy components (or 10 vol % or more). The one or more light components, if present, correspond to components that are part of an intermediate product from the tower (i.e., not part of the top product from the tower). Similarly, the one or more heavy components, if present, correspond to components that part of a different intermediate product from the tower. In various aspects, when operating the column, the one or more light components can be prevented from exiting the feed entry volume via the vapor split at the bottom of the dividing wall defining the feed entry volume. Additionally or alternately, the one or more heavy components can be prevented from exiting the feed entry volume via the liquid split at the top of the dividing wall defining the feed entry volume. This can correspond to, for example, limiting the amount of the one or more light components at the vapor split to 0.1 vol % or less of the composition at the vapor split. Similarly, the amount of the one or more heavy components can be limited to 0.1 vol % or less of the composition at the liquid split.

In order to control the plurality of temperatures in the feed entry volume, other variables that can be manipulated and/or controlled include (but are not limited to) the tower overhead pressure, the reboiler or heater duty, the cut-point temperature for one or more of the product draws, the draw rate for one or more of the product draws, the feed flow rate, the bottoms flow rate, the overhead internal reflux, the overhead distillate, the bottoms level, and the reflux drum level. Additionally, the feed and/or product compositions can be analyzed as a further source of input. For example, control of the reboiler duty and the overhead internal reflux can allow for control of temperature at various locations within the column, including within the feed entry volume.

Definitions

In this discussion, a dividing wall is defined as a partition wall or other barrier that prevents fluid flow that is disposed roughly parallel to/passes through the central axis of a distillation column. The dividing wall can intersect with the interior wall of the distillation column (referred to as the column wall) in one or more locations, such as intersecting in two locations. The dividing wall can typically have a height that is less than the interior height of the distillation column.

In this discussion, a divided volume is defined as a volume within a distillation column that is bounded laterally by at least one dividing wall and either the column wall or a second dividing wall. This is in contrast to a common volume within a distillation column, which refers to a volume that spans substantially the entire interior cross-section of the distillation column at the heights/elevations corresponding to the common volume. Divided volumes have substantially no fluid communication laterally through a dividing wall. Instead, any fluid communication between divided volumes that are separated by a dividing wall is indirect, based on fluid communication via, for example, an upper common volume or a lower common volume. The vertical boundaries for a divided volume are based on the packed beds and other associated internals in the dividing wall column. In this discussion, the vertical boundaries of a divided volume are defined as the top of the liquid distributor tray(s) (or other flow distributor) located above a packed bed to the bottom of the chimney tray, liquid withdrawal tray, or another structure suitable for product withdrawal below the same packed bed. If a liquid/flow distributor is not present above a packed bed, then the divided volume starts at the top of the packed bed. If a chimney tray or other comparable structure is not present below a packed bed, then the divided volume ends at the structure that starts the next divided volume. It is noted that the divided volumes in a dividing wall column do not need to be contiguous under these definitions. It is further noted that the feed entry volume may not correspond to a divided volume. For example, the feed entry volume may correspond to a volume between a chimney tray and a flow distributor. Finally, it is noted that a packed bed and associated internals may not correspond to a divided volume under this definition if a portion of the associated internals are beyond the dividing wall. For example, two sections of adjacent packed beds may be separated by a dividing wall, but may share a common chimney tray that is below the level of the dividing wall. This type of internal configuration falls outside of the definition of a divided volume.

In this discussion, a packed bed is defined according to the conventional definition. Therefore, a packed bed has an available volume between the particles/structures and/or in the pores in the packed bed for holding a fluid. References to a total volume for a packed bed correspond to this available volume. In this discussion, percent vapor flood for a packed bed is defined as the percent capacity relative to the flood point, which is defined by Fractionation Research, Inc. (FRI). In this discussion, a target percent flood corresponds to a value for comparison with the percent flood for packed beds within the divided volumes in a distillation column.

In this discussion, references to boiling points or distillation points correspond to distillation points as determined according to ASTM D2887, or alternatively according to ASTM D86 and/or ASTM D7169 if ASTM D2887 is unsuitable due to the nature of the sample. References to "Tx" distillation points refer to a fractional weight "x" of a sample that can be distilled at the identified temperature. For example, a T10 distillation point corresponds to a temperature at which 10 wt % of a sample can be distilled. In this discussion, boiling points and/or ranges for fractions that include compounds corresponding to light ends (i.e., $C_1$ to $C_4$ compounds) may be described based on the carbon number of the hydrocarbons that are included within a fraction, in accordance with the common practice by those of skill in the art. For example, a boiling range that is described as $C_4$ to 200° C. represents a boiling range that has a sufficiently low endpoint to include $C_4$ hydrocarbons. Similarly, a light ends fraction corresponding to $C_1$ to $C_4$ compounds can have a boiling range with a sufficiently low endpoint to include methane and a sufficiently high endpoint to include $C_4$ hydrocarbons.

In this discussion, two product streams can be compared based on the volatility of the streams as determined by normal boiling point. In this discussion, comparing the volatility of two streams based on normal boiling point is defined as comparing the streams based on the T50 boiling points of the streams at normal conditions (i.e., 1 atm or ~100 kPa-a). A first stream is defined as having lower volatility than the second stream if the T50 boiling point of the first stream is higher than the corresponding T50 boiling point of the second stream.

In this discussion, fluid communication can refer to direct fluid communication or indirect fluid communication. Indirect fluid communication refers to the ability for fluids to pass from a first volume to a second volume via an intervening volume.

Feedstocks

Any convenient type of feedstock that is suitable for separation in a traditional distillation column and/or plurality of columns can be separated using a dividing wall column. Examples of suitable feeds for separation can include, but are not limited to, hydrocarbon (or hydrocarbon-like) feeds. Hydrocarbon-like feeds can include feeds that have one or more heteroatoms other than carbon or hydrogen. Examples of hydrocarbon-like compounds include, but are not limited to, oxygenates (such as alcohols, esters, and ethers), nitrogen-containing compounds (such as amines), and sulfur-containing compounds (such as mercaptans). It is noted that such heteroatoms may be contained in a ring structure, such as a cyclic ether or a thiophene.

In some aspects, a suitable feed (or other fraction) can have a boiling range that includes light ends. For example, the lower end of the boiling range can be sufficiently low to include $C_1$ hydrocarbons, or sufficiently low to include $C_2$ hydrocarbons (but exclude $C_1$ hydrocarbons), or sufficiently low to include $C_3$ hydrocarbons (but exclude $C_2$ hydrocarbons), or sufficiently low to include $C_4$ hydrocarbons (but exclude $C_3$ hydrocarbons). For example, a feed (or other fraction) that includes various types of light ends can have a boiling range defined by an initial boiling point to a T90 distillation point of $C_1$ to 350° C., or $C_1$ to 270° C., or $C_1$ to 200° C., or $C_1$ to 150° C. As another example, a feed (or other fraction) that includes $C_2$ hydrocarbons can have a boiling range defined by an initial boiling point to a T90 distillation point of $C_2$ to 350° C., or $C_2$ to 270° C., or $C_2$ to 200° C., or $C_2$ to 150° C. As still another example, a feed (or other fraction) that includes $C_3$ hydrocarbons can have a boiling range defined by an initial boiling point to a T90 distillation point of $C_3$ to 350° C., or $C_3$ to 270° C., or $C_3$ to 200° C., or $C_3$ to 150° C. As yet another example, a feed (or other fraction) that includes $C_4$ hydrocarbons can have a boiling range defined by an initial boiling point to a T90 distillation point of $C_4$ to 350° C., or $C_4$ to 270° C., or $C_4$ to 200° C., or $C_4$ to 150° C. As still another example, a feed (or other fraction) that includes $C_5$ hydrocarbons can have a boiling range defined by an initial boiling point to a T90 distillation point of $C_5$ to 350° C., or $C_5$ to 270° C., or $C_5$ to 200° C., or $C_5$ to 150° C.

In other aspects, a suitable feed can have a T10 distillation point of at least 60° C., or at least 90° C., or at least 120° C. In some aspects, a suitable feed can have a T90 distillation point of 350° C. or less, or 300° C. or less or 270° C. or less, or 200° C. or less, or 150° C. or less. For example, suitable feeds can have a T10/T90 distillation range of at least 60° C. to 150° C. or less, or at least 60° C. to 200° C. or less, or at least 60° C. to 300° C. or less, or at least 90° C. to 200° C. or less, or at least 90° C. to 270° C. or less, or at least 120° C. to 300° C. or less, or at least 120° C. to 350° C. or less. It is noted that feeds with still higher T90 distillation points may be suitable for separation, as such higher boiling portions of a feed can form a "bottoms" fraction while the lower boiling portions correspond to the products withdrawn from various divided volumes.

As an example, a feed composed of primarily benzene, toluene, xylene along with light ends and heavy components as impurities. The corresponding separation could produce at least 5 products, corresponding to a light ends product, a heavy product, and products substantially corresponding to benzene, toluene, and xylene. Such a separation could be performed in a dividing wall column separator having two dividing walls, with the benzene, toluene, and mixed xylene products being withdrawn from different divided volumes in the tower sections defined by a dividing wall and the interior wall of the column.

As another example, a suitable feed can correspond to a feed that includes hydrocarbons (or hydrocarbon-like compounds) containing 6 or more carbons per compound. In such an example, a dividing wall distillation column could be used to form 6 products. A top product could correspond to a $C_9$ or lighter product while a bottoms product could correspond to a $C_{18}$ or heavier product. The divided volumes from one tower section could be used to withdraw a $C_{10}$-$C_{11}$ product and a $C_{14}$-$C_{15}$ product, while divided volumes from a second tower section could be used to withdraw a $C_{12}$-$C_{13}$ product and a $C_{16}$-$C_{17}$ product.

In some aspects, a feed can include at least one target component or target boiling range, and at least one substantial adjacent component or boiling range, as defined above. In some aspects, the amount of the target component or target boiling range can be 20 wt % or less of the feed, or 10 wt % or less, or 5.0 wt % or less, or 2.0 wt % or less, such as down to 0.1 wt % or possibly still lower. Additionally or alternately, the amount of the substantial adjacent component or boiling range can be 2.0 wt % or more of the feed, or 5.0 wt % or more, or 10 wt % or more, or 20 wt % or more, such as up to 60 wt % or possibly still higher.

Separation Stage Example: Pressure Swing Adsorption

The separation stage in the external loop can be any convenient type of separation stage that allows for separation of components using a mechanism different from boiling point distillation. One example of a suitable type of separation stage is a membrane separation stage. In a membrane separation, a membrane can allow at least one component to be selectively transmitted across the membrane into the permeate while the retentate is enriched in at least a second component. Depending on the nature of the membrane and the nature of the intermediate flow in the external loop, either the permeate or the retentate could contain the desired component(s) that are returned to the dividing wall column on the opposite side of the dividing wall. Depending on the type of separation, suitable membranes can include polymer membranes, membranes based on zeolitic framework structures, or other convenient types of membrane structures. If a membrane is used with sufficient structural integrity, an osmotic separation can be used. Alternatively, the intermediate flow in the external loop can be heated sufficiently to allow the membrane separation to be performed under gas phase conditions.

Another example of a separation stage can be a swing adsorption stage, such as a pressure swing adsorption stage. Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases, e.g. steam, can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/ "absorbent"/"sorbent"/"sorption" and "component(s)" may be more generally applicable.

Swing adsorption processes are used for a variety of types of separations. Generally, swing adsorption processes are performed using gas phase feeds, so the intermediate flow in the external loop can be heated sufficiently to allow the swing adsorption process to be performed. The nature of the swing adsorption conditions and the adsorbent can vary depending on the desired separation, and the adsorbent and adsorption conditions can be selected based on conventional considerations.

A full pressure swing adsorption cycle involves, at a minimum, an adsorption stage (for adsorbing one or more components from an input flow) and a desorption stage (to regenerated the adsorbent by removing the adsorbed components). In order to provide a continuous or semi-continuous output flow, a plurality of adsorbent beds can be used. The multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

Configuration Example

U.S. Pat. No. 9,278,898 describes using a divided wall column to separate a feed into five product streams. The product streams include cyclododecanone, cyclododecanol, and product streams that boil above (high boilers), below (low boilers), and between (medium boilers) the boiling points of the cyclodedecanone and cyclododecanol. This type of feed represents an output stream from a process for dehydrogenation of cyclodecanol to form cyclodecanone.

A configuration similar to FIG. 2 can be used to provide an improve separation for an output stream from dehydrogenation of cyclodecanol to form cyclodecanone. In the configuration similar to the configuration shown in FIG. 2, product stream 271 can correspond to the low boilers in the dehydrogenation product, while product stream 279 can correspond to the high boilers. The intermediate liquid 255 can correspond to a mixture of cyclodecanone, the medium boilers, and cyclodecanol. In this type of configuration, the goal of the separation can be to form a product stream 265 enriched in the medium boilers, so as to avoid inclusion of the medium boilers in either product stream 262 (cyclodecanone) or product stream 267 (cyclodecanol). In order to achieve this goal, the intermediate liquid 255 can be passed through a separation stage 260 selectively removes cyclodecanol. In the configuration shown in FIG. 2, product stream 267 is formed by the separation stage 260. In other aspects, if less than all of the cyclodecanol is removed by separation stage 260, a second product stream enriched in cyclodecanol can also be withdrawn from the distillation tower.

Separation Efficiency Example

The following is a prophetic example. A dividing wall column, such as column 100 shown in FIG. 1, can be viewed as two separate stages based on the two separate divided volumes generated by the wall 110. These separate stages are effectively in series for the purposes of purifying component B as well as components A and C. This is shown in FIG. 1 by extracting stream 155 from the first stage (left of the wall 110) and introducing stream 165 into the second stage (right of the wall). The insertion of stream 165 will typically occur close to the extraction point for product stream 175 of column 100. In some aspects, the input stream 165 can be inserted a small distance above the extraction point for product stream 175, to allow the down-flowing liquid in the section of column 100 to the right of the wall 110 to mix with the concentrated stream 165 before the extraction to form stream 175 is performed.

In order to achieve the benefit of using the stages in series, a product partially enriched in product B is withdrawn from the first stage and introduced into the second stage. It has been discovered that the benefit of withdrawing the partially enriched product from the first stage has a strong sensitivity to the amount of enrichment. By adding a membrane or swing adsorption stage to the loop connecting the first stage and the second stage, the benefit of using the partially enriched product can be realized, even though the withdrawal location from the first stage may not be optimized.

Tables 1 and 2 below illustrate the benefit of adding a membrane or swing adsorption stage in the loop connecting a first and second stage. In the prophetic example shown in Tables 1 and 2, a configuration similar to FIG. 1 is used. The example shown in Table 1 corresponds to a conventional configuration, where separation stage 160 is not included, so that stream 155 and stream 165 have the same composition. The example shown in Table 2 includes separation stage 160, as shown in FIG. 1. The data shown in Table 1 and Table 2 was generated by assuming an initial feed to dividing wall column 100 that includes 70 wt % component A, 1 wt % component B, and 29 wt % component C. Separation of the feed using both the conventional configuration and the configuration in FIG. 1 was modeled using an empirically based separation model.

In the example shown in Tables 1 and 2, the withdrawal location for stream 155 is not in the optimal location, so that the flow rate of component B in stream 155 is only 0.97 g/s. For the conventional configuration (Table 1), component A and component C correspond to a substantial majority of the stream 155 that is withdrawn from the first stage, so that the flow rate of 0.97 g/s in stream 155 corresponds to roughly 4 wt % of stream 155. Since there is no separation stage in the external loop in the conventional configuration, the stream 165 that is passed into the second stage also has a roughly 5 wt % concentration of component B. Based on introducing a stream containing 5 wt % of component B into the second stage, the conventional configuration (no separation stage 160) produces a final concentration of B in stream 175 of roughly 12 wt %.

In contrast to the conventional configuration corresponding to Table 1, Table 2 is based on the configuration shown in FIG. 1 that includes separation stage 160. Thus, even though stream 155 is withdrawn from the same location for the separations described in Table 1 and Table 2, the resulting stream that is added to the second stage in Table 2 has a substantially higher concentration of component B, due to the presence of separation stage 160. For the purposes of this prophetic example, it is assumed that the separation stage 160 allows 100% of component B to be passed through the separation stage, while the separation stage allows for rejection of roughly 80 wt % of component A and roughly 70 wt % of component C. By rejecting portions of component A and component C in separation stage 160, the concentration of component B in stream 165 is increased to roughly 18 wt % in Table 2. By increasing the concentration of component B that is introduced into the second stage, a still higher purity final product stream 175 can be generated with a concentration of component B of roughly 42 wt %. This illustrates that using separation stage 160 allows a minor component in a feed (component B) to be efficiently separated out as a relatively high purity product, even though the removal location for the intermediate stream 155 from the first stage was not optimized. It is noted that the rejected portions of component A and component C are thus added to the top and bottom separation products for Stage 1 in Table 2, thus increasing the amount of component A separated out as the top component and the amount of component C separated out as the bottom component in Stage 1. By contrast, in the conventional configuration used for Table 1, a higher percentage of component A and component C are separated out as top and bottom components (respectively) from the second stage.

ADDITIONAL EMBODIMENTS

Embodiment 1. A method for separating a feed into a plurality of products, comprising: passing a feed comprising a plurality of components into a first divided volume on a first side of a dividing wall in a distillation column, the feed comprising i) at least one of a target component and a target boiling range and ii) one or more components or boiling ranges that are substantially adjacent to the target component or the target boiling range, the first divided volume being in fluid communication with a top common volume and in fluid communication with a bottom common volume; operating the distillation column to separate the feed into a plurality of products; withdrawing, during the operating, an intermediate stream from an intermediate withdrawal location on the first side of the dividing wall, the intermediate stream comprising the at least one target component or target boiling range and at least one substantially adjacent component or substantially adjacent boiling range, the intermediate stream comprising a greater volume percentage of the at least one target component or target boiling range than the feed, the intermediate stream comprising fewer components than the feed; passing the intermediate stream into a separation stage to form a separation stage effluent and a separation stage rejection stream, the separation stage effluent comprising a greater weight percentage of the at least one target component or target boiling range than the intermediate stream; passing the separation stage effluent into a second divided volume on an opposite side of the dividing wall in the distillation column; and withdrawing a product stream comprising the at least one target component or target boiling range from the second divided volume, the product stream comprising a greater weight percentage of the at least one target component or target boiling range than the separation stage effluent.

TABLE 1

(Conventional, no separation stage in external loop)

| | STAGE 1 | | | feed to stage 2 | | STAGE 2 | | | |
|---|---|---|---|---|---|---|---|---|---|
| | | | | stream # | | | | | |
| | 105 FEED gm/s | 172a TOP gm/s | 177a BOTTOM gm/s | 155 gm/s | | 172b TOP gm/s | 177b BOTTOM gm/s | 175 SIDE gm/s | SIDE PURITY wt % |
| Component | 100 | 56.57 | 23.43 | 20.00 | wt % | 9.04 | 3.45 | 7.51 | |
| A | 70 | 56.00 | 0.23 | 13.77 | 68.87 | 8.95 | 0.03 | 4.79 | 63.82 |
| B | 1 | 0.02 | 0.01 | 0.97 | 4.87 | 0.01 | 0.01 | 0.95 | 12.70 |
| C | 29 | 0.55 | 23.20 | 5.25 | 26.27 | 0.08 | 3.41 | 1.76 | 23.47 |

TABLE 2

(Configuration in FIG. 1)

| | STAGE 1 | | | feed to stage 2 | | STAGE 2 | | | |
|---|---|---|---|---|---|---|---|---|---|
| | | | | stream # | | | | | |
| | 105 FEED gm/s | 172a TOP gm/s | 177a BOTTOM gm/s | 165 gm/s | | 172b TOP gm/s | 177b BOTTOM gm/s | 175 SIDE gm/s | SIDE PURITY wt % |
| Component | 100 | 67.88 | 26.95 | 5.17 | wt % | 1.92 | 1.26 | 1.99 | |
| A | 70 | 67.20 | 0.26 | 2.54 | 49.10 | 1.90 | 0.01 | 0.63 | 31.54 |
| B | 1 | 0.02 | 0.01 | 0.97 | 18.72 | 0.01 | 0.00 | 0.96 | 48.14 |
| C | 29 | 0.66 | 26.68 | 1.66 | 32.17 | 0.01 | 1.25 | 0.40 | 20.32 |

Embodiment 2. The method of Embodiment 1, wherein the feed comprises 20 wt % or less of the at least one target component or target boiling range.

Embodiment 3. The method of any of the above embodiments, wherein the feed comprises 2.0 wt % or more (or 20 wt % or more) of the at least one substantially adjacent component or substantially adjacent boiling range.

Embodiment 4. The method of any of the above embodiments, wherein the at least one substantially adjacent component or substantial adjacent boiling range differs from the target boiling range by 3.0° C. or less, or wherein the at least one substantially adjacent component or substantial adjacent boiling range differs from a target boiling point of the target component by 3.0° C. or less.

Embodiment 5. The method of any of the above embodiments, wherein the separation stage rejection stream comprises a greater weight percentage of the at least one substantially adjacent component or substantially adjacent boiling range than the intermediate stream.

Embodiment 6. The method of any of the above embodiments, wherein the intermediate stream is withdrawn into an external loop.

Embodiment 7. The method of any of the above embodiments, wherein the separation stage comprises a membrane separator, the separation stage effluent comprising at least a portion of a permeate from the membrane separator or comprising at least a portion of a retentate from the membrane separator.

Embodiment 8. The method of any of the above embodiments, wherein the separation stage comprises an adsorber, the adsorber optionally comprising a swing adsorber, the adsorber optionally being selective for adsorption of the at least one substantially adjacent component or substantially adjacent boiling range.

Embodiment 9. The method of any of the above embodiments, wherein the distillation column comprises a plurality of dividing walls.

Embodiment 10. The method of any of the above embodiments, wherein the dividing wall comprises the intermediate withdrawal location.

Embodiment 11. The method of any of the above embodiments, wherein the separation stage comprises a non-distillation based separation stage.

Embodiment 12. A system for separating a feed, comprising: a distillation column comprising at least one dividing wall defining a first divided volume on a first side of the dividing wall and a second divided volume on an opposite side of the dividing wall; and a non-distillation based separation stage in fluid communication with the first divided volume and the second divided volume via an external loop.

Embodiment 13. The system of Embodiment 12, wherein the system comprises a plurality of dividing walls.

Embodiment 14. The system of Embodiment 12 or 13, wherein the non-distillation based separation stage comprises a membrane separator.

Embodiment 15. The system of Embodiment 12 or 13, wherein the non-distillation based separation stage comprises a swing adsorber.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for separating a feed into a plurality of products, comprising:
    passing a feed comprising a plurality of components into a first divided volume on a first side of a dividing wall in a distillation column, the feed comprising i) at least one of a target components and a target boiling range fraction and ii) one or more components or boiling range fractions that are substantially adjacent to the target component or the target boiling range fraction, the first divided volume being in fluid communication with a top common volume and in fluid communication with a bottom common volume;
    operating the distillation column to separate the feed into a plurality of products;
    withdrawing, during the operating, an intermediate stream from an intermediate withdrawal location on the first side of the dividing wall, the intermediate stream comprising the at least one target component or target boiling range fraction and at least one substantially adjacent component or substantially adjacent boiling range fraction, the intermediate stream comprising a greater volume percentage of the at least one target component or target boiling range fraction than the feed, the intermediate stream comprising fewer components than the feed;
    passing the intermediate stream into a separation stage to form a separation stage effluent and a separation stage rejection stream, the separation stage effluent comprising a greater weight percentage of the at least one target component or target boiling range fraction than the intermediate stream;
        wherein the separation stage comprises a membrane separator or an adsorber;
    passing the separation stage effluent into a second divided volume on an opposite side of the dividing wall in the distillation column; and
    withdrawing a product stream comprising the at least one target component or target boiling range fraction from the second divided volume, the product stream comprising a greater weight percentage of the at least one target component or target boiling range fraction than the separation stage effluent.

2. The method of claim 1, wherein the feed comprises 20 wt % or less of the at least one target component or target boiling range fraction.

3. The method of claim 1, wherein the feed comprises 2.0 wt % or more of the at least one substantially adjacent component or substantially adjacent boiling range fraction.

4. The method of claim 1, wherein the feed comprises 20 wt % or more of the at least one substantially adjacent component or substantially adjacent boiling range fraction.

5. The method of claim 1, wherein the at least one substantially adjacent component or substantially adjacent boiling range fraction differs from the target boiling range fraction by 3.0° C. or less.

6. The method of claim 1, wherein the at least one substantially adjacent component or substantially adjacent boiling range fraction differs from a target boiling point of the target component by 3.0° C. or less.

7. The method of claim 1, wherein the separation stage rejection stream comprises a greater weight percentage of the at least one substantially adjacent component or substantially adjacent boiling range fraction than the intermediate stream.

8. The method of claim 1, wherein the intermediate stream is withdrawn into an external loop.

9. The method of claim 1, wherein the separation stage effluent comprises at least a portion of a permeate from the membrane separator.

10. The method of claim 1, wherein the separation stage effluent comprises at least a portion of a retentate from the membrane separator.

11. The method of claim 1, wherein the separation stage comprises a swing adsorber.

12. The method of claim 1, wherein the separation stage comprises an adsorber, the adsorber being selective for adsorption of the at least one substantially adjacent component or substantially adjacent boiling range fraction.

13. The method of claim 1, wherein the distillation column comprises a plurality of dividing walls.

14. A system for separating a feed, comprising:
a distillation column comprising at least one dividing wall defining a first divided volume on a first side of the dividing wall and a second divided volume on a second side of the dividing wall;
a feed input stream on the first side; and
an external loop providing fluid communication between an intermediate withdraw location on the first side and an intermediate input location on the second side of the dividing wall, the external loop comprising a separation stage; and at least one product stream on the second side and wherein the separation stage comprises a membrane separator or a swing adsorber.

15. The system of claim 14, wherein the non-distillation based separation stage comprises a membrane separator.

16. The system of claim 14, wherein the non-distillation based separation stage comprises a swing adsorber.

* * * * *